United States Patent
Chen et al.

(10) Patent No.: US 11,019,401 B2
(45) Date of Patent: May 25, 2021

(54) SATELLITE SIGNAL SWITCHING SYSTEM

(71) Applicant: AT&T Intellectual Property I, L.P., Atlanta, GA (US)

(72) Inventors: Drew Chen, Clarksburg, MD (US); Richard Tatem, Middletown, MD (US); Dana Greer, Frederick, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 16/433,695

(22) Filed: Jun. 6, 2019

(65) Prior Publication Data

US 2020/0389618 A1 Dec. 10, 2020

(51) Int. Cl.
| | |
|---|---|
| *H04N 21/61* | (2011.01) |
| *H04N 21/2665* | (2011.01) |
| *H04N 21/47* | (2011.01) |
| *H04N 5/50* | (2006.01) |
| *H04N 21/426* | (2011.01) |

(52) U.S. Cl.
CPC ............. *H04N 21/47* (2013.01); *H04N 5/50* (2013.01); *H04N 21/2665* (2013.01); *H04N 21/426* (2013.01); *H04N 21/6143* (2013.01); *H04N 21/6193* (2013.01)

(58) Field of Classification Search
CPC .. H04N 21/47; H04N 21/426; H04N 21/6143; H04N 5/50; H04N 21/2665; H04N 21/6193

See application file for complete search history.

(56) References Cited

U.S. PATENT DOCUMENTS

| | | | | |
|---|---|---|---|---|
| 10,128,931 | B2* | 11/2018 | Rothaar | H01Q 21/0012 |
| 2002/0050953 | A1* | 5/2002 | Fang | G01S 3/20 |
| | | | | 343/703 |
| 2008/0137821 | A1* | 6/2008 | Ho | H04L 12/2801 |
| | | | | 379/90.01 |
| 2010/0203823 | A1* | 8/2010 | Apaar | H04H 20/24 |
| | | | | 455/3.06 |
| 2013/0055320 | A1* | 2/2013 | Mitchell | H04N 21/2146 |
| | | | | 725/76 |
| 2016/0021424 | A1* | 1/2016 | Andersson | H04N 21/4622 |
| | | | | 725/110 |

(Continued)

*Primary Examiner* — Pinkal R Chokshi
(74) *Attorney, Agent, or Firm* — Guntin & Gust, PLC; Kenneth Kwan

(57) ABSTRACT

A content signal switching controller receives first signal information about a first content signal provided by a first satellite antenna and received by a trunk distribution system. The first signal information indicates the quality of a satellite signal that is received by the first satellite antenna and that is converted to the first content signal. The content signal switching controller receives second signal information about a second content signal provided by a second satellite antenna. The second signal information indicates the quality of the satellite signal that is received by the second satellite antenna. In response to the content signal switching controller determining that the first signal information and the second signal information satisfy a first signal switching condition, a content signal switch instruction is provided to a switch device to switch the trunk distribution system from being provided the first content signal to being provided the second content signal.

20 Claims, 8 Drawing Sheets

(56) References Cited

U.S. PATENT DOCUMENTS

| | | | |
|---|---|---|---|
| 2017/0041600 A1* | 2/2017 | Martch | H04N 17/004 |
| 2017/0230698 A1* | 8/2017 | Gilboy | H04N 21/6143 |
| 2017/0302302 A1* | 10/2017 | Adamski | H04B 1/18 |
| 2018/0255338 A1* | 9/2018 | Ross | H04N 21/4821 |
| 2018/0332338 A1* | 11/2018 | Hardee | H04N 21/6112 |
| 2019/0261040 A1* | 8/2019 | Day | H04N 21/6332 |
| 2020/0008122 A1* | 1/2020 | Radko | H04W 76/34 |
| 2020/0212992 A1* | 7/2020 | Preston | H04B 7/18513 |
| 2020/0267575 A1* | 8/2020 | Buer | H04W 24/02 |

* cited by examiner

SATELLITE SIGNAL SWITCHING SYSTEM

FIELD OF THE DISCLOSURE

This disclosure relates generally to a content distribution system, and, more particularly, to a satellite signal switching system in the content distribution system.

BACKGROUND

Certain geographical areas are prone to intermittent weather such as snow, rain, ice, and other conditions that affect a satellite signal being received at a user location. This absorption of a microwave radio frequency (RF) signal by precipitation is primarily referred to as rain fade. Rain fade may cause the satellite signal to become attenuated to the point that the end set-top box receiver cannot provide the content for the programming channel that is being viewed by the user or the content is distorted. While this may be a brief annoyance to an average residential customer in the geographical area where the interfering weather or condition is occurring, other customers that rely on the satellite service for high profile events may desire a more reliable content distribution system that does not lose satellite service during weather events. This may be particularly true for customers in higher-density housing or commercial environments (e.g., "Multi-Dwelling Units" (MDU) such as apartments, golf courses, office buildings, hotels, race tracks, stadiums, arenas, or other MDUs) where hundreds of set-top box receivers may be receiving content via a single "satellite dish" antenna.

Thus, the Applicant recognizes that there is a need for an improved content distribution system.

SUMMARY

In various embodiments of the methods and systems disclosed herein, a method of content signal switching includes, receiving, by a content signal switching controller, first signal information about a first content signal provided by a first satellite antenna and received by a trunk distribution system, wherein the first signal information indicates the quality of a satellite signal received by the first satellite antenna and converted to the first content signal; receiving, by the content signal switching controller, second signal information about a second content signal provided by a second satellite antenna, wherein the second signal information indicates the quality of the satellite signal received by the second satellite antenna; determining, content signal switching controller, that the first signal information and the second signal information satisfy a first signal switching condition; and providing, by the content signal switching controller and in response to the determining that the first signal information and the second signal information satisfy the first signal switching condition, a first content signal switch instruction to switch the trunk distribution system from being provided the first content signal to being provided the second content signal.

In various embodiments of the methods and systems disclosed herein, a content signal switching controller, includes: a processor; and a computer-readable medium storing instructions which, when executed by the processor cause the processor to perform operations comprising: receiving first signal information about a first content signal provided by a first satellite antenna and received by a trunk distribution system, wherein the first signal information indicates the quality of a satellite signal received by the first satellite antenna and converted to the first content signal; receiving second signal information about a second content signal provided by a second satellite antenna, wherein the second signal information indicates the quality of the satellite signal received by the second satellite antenna; determining that the first signal information and the second signal information satisfy a first signal switching condition; and providing, in response to the determining that the first signal information and the second signal information satisfy the first signal switching condition, a first content signal switch instruction to switch the trunk distribution system from being provided the first content signal to being provided the second content signal.

In various embodiments of the methods and systems disclosed herein, a non-transitory computer-readable storage medium storing instructions which, when executed by a processor, cause the processor to perform operations, the operations comprising: receiving first signal information about a first content signal provided by a first satellite antenna and received by a trunk distribution system, wherein the first signal information indicates the quality of a satellite signal received by the first satellite antenna and converted to the first content signal; receiving second signal information about a second content signal provided by a second satellite antenna, wherein the second signal information indicates the quality of the satellite signal received by the second satellite antenna; determining that the first signal information and the second signal information satisfy a first signal switching condition; and providing, in response to the determining that the first signal information and the second signal information satisfy the first signal switching condition, a first content signal switch instruction to switch the trunk distribution system from being provided the first content signal to being provided the second content signal.

DETAILED DESCRIPTION

Figure 1:
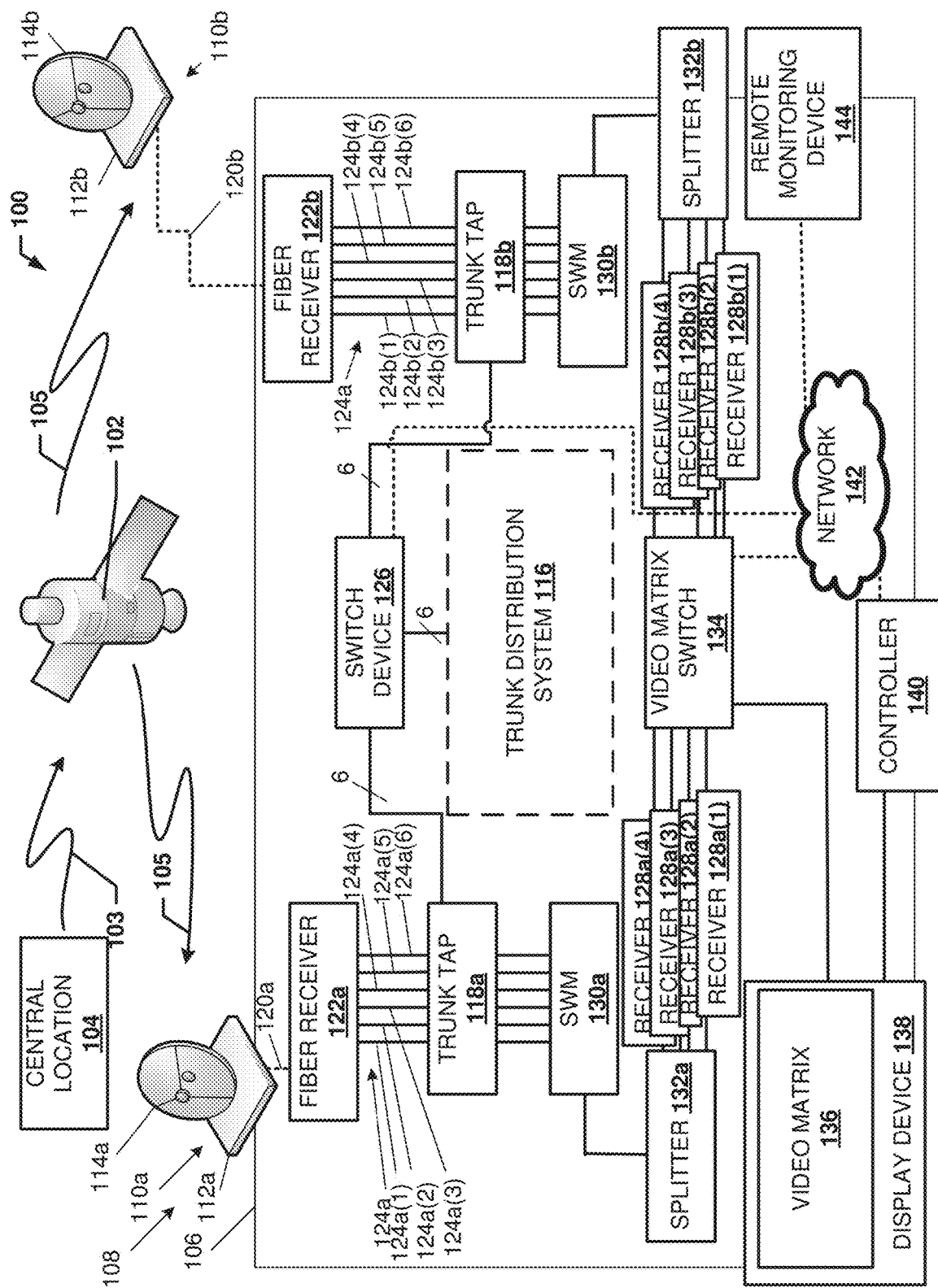
FIG. 1 is a schematic view illustrating an embodiment of content distribution system.

The systems and methods of the present disclosure provide a satellite signal switching system that is configured to switch a trunk distribution system from receiving a first content signal that is provided by a primary satellite antenna to receiving a second content signal that is provided on a backup satellite antenna. As discussed above, conventional satellite antennas may experience rain fade such that a satellite signal received by a satellite antenna from a satellite transceiver and converted to a content signal provided through the trunk distribution system is diminished because of the intermittent weather or other condition in the environment at which the primary satellite antenna is located attenuating the satellite signal. However, some customers of the satellite service may require a more reliable content distribution system that does not lose satellite service during weather events.

The satellite signal switching system of the present disclosure addresses these issues by providing a backup satellite antenna in addition to a primary satellite antenna that are both coupled to a switch device that is coupled to the trunk distribution system. The switch device may be configured to switch between the content signals provided by the backup satellite antenna and the primary satellite antenna based on instructions received by a content signal switching controller. The backup satellite antenna may be located at a different geographical location than the geographical location in which the primary satellite antenna is positioned. As such, the backup satellite antenna may not be experiencing the weather conditions or other interfering condition that are in the vicinity of the geographical location of the primary satellite antenna. The content signal switching controller may monitor content signals provided by the primary satellite antenna and provided by the backup satellite antenna that are being received by the switch device. The content signals may be monitored by the content signal switching controller via monitoring set-top box receivers configured to provide the content signal switching controller content signal information of the content signals that are being provided by each monitoring set-top box receiver. Each monitoring set-top box receiver may be tuned to a programming channel that is known to be on one of the trunk cables of a set of trunk cables coupled to the primary satellite antenna. Furthermore, other monitoring set-top box receivers may be tuned to a programming channel that is known to be on one of the trunk cables of a set of trunk cables coupled to the backup satellite antenna.

The content signal switching controller may determine whether the signal information about the content signals from the primary satellite antenna and the signal information about the content signals form the backup satellite antenna satisfy a content signal switching condition. If the content signal switching condition is satisfied, the content signal switching controller will provide instruction to the switch device to provide the content signal from the backup satellite antenna to the trunk distribution system instead of the content signal provided by the primary satellite antenna. The content signal switching controller may then continue to monitor the signal information about the content signals from the primary satellite antenna and the signal information about the content signals form the backup satellite antenna to determine whether a content signal switch condition exists that requires the content signal switching controller to provide instruction to the switch device to provide the content signal from the primary satellite antenna to the trunk distribution system instead of the content signal provided by the backup satellite antenna. As such, the systems and methods of the present disclosure help reduce the effects of weather on the content distribution system by feeding in a content signal from a backup satellite antenna that may not be experiencing the same conditions as the primary satellite antenna or switching back to the content signal provided by the primary satellite antenna when conditions improve at the primary satellite antenna or become worse at the backup satellite antenna.

Referring now to FIG. 1, a content distribution system 100 is shown for broadcasting content included in, for example, television signals. The content distribution system 100 includes a satellite 102 that is configured to receive content, for example, via a receiving antenna, from a central location 104. The central location 104 may be a data processing facility or headend, which may receive content (e.g., data input programming) from multiple sources. The central location 104 may combine the content from the various sources and may distribute the content to user subscriber locations via wireless signals. The wireless signals, for example, may be digital and in a format used for satellite communications. For example, the wireless signals may be transmitted in one or more radio frequency (RF) bands, e.g., the microwave Ka-band (26.5-40 GHz) and/or Ku-band (12.4-18 GHz). The wireless signal may additionally or alternatively include other RF bands (e.g., 12.2-12.7 GHz and/or 18.3-20.2 GHz). The central location 104 may generate wireless signals 103 through a transmitting antenna, which are received by a receiving antenna of the satellite 102. A transmitting antenna provided by the satellite 102 generates wireless signals 105 directed to various receiving systems including stationary and/or moving systems at user subscriber locations such as those in residential and commercial settings (e.g., a multiple dwelling unit (MDU) 106). The MDU 106 may be a single building with multiple individual units such as a hotel or an apartment building, a property with multiple buildings, a ship with multiple individual units, an oil rig, a house, a stadium, a golf course with outdoor and indoor viewing areas, and other venues or spaces that may require the benefits of a satellite signal switching system disclosed herein.

The wireless signals 103 and 105 may include various types of data associated with them including various programming channel information such as a programming channel guide, metadata, location information, and the like. Various types of data may be communicated about the programming and grid guide including the programming channel number, a network identifier, program data such as a start and end time of airing, title, numerical identifier, content data such as actors, descriptions, ratings and the like. The program guide data may include the relative positions of the data, the line structures for forming the grid for the program guide and the like. The wireless signals 103 and 105 may also include various types of content (e.g., audio content, video content). A content provider may provide content to the central location 104. The content provider may include various television networks that provide programming and content for a particular programming channel as well as on-demand and pay-per-view providers that provide content for communication at particular times over programming channels specified at the central location 104.

The content distribution system 100 may include a satellite signal switching system 108 at the MDU 106. The satellite signal switching system 108 includes an outside unit 110a that includes a control circuit 112a and a primary satellite antenna (e.g., satellite dish) 114a that receives the wireless signals 105 from the satellite 102. The content, programming channel information, and any other information included in the wireless signals 103 and 105 may be referred to as content signals herein when received at the satellite signal switching system 108. The control circuit 112a controls the content signals received from the primary satellite antenna 114a and passes the communication of the content signals to a trunk distribution system 116 downstream from the primary satellite antenna 114a.

The control circuit 112a may be coupled to a trunk tap 118a. For example, in the illustrated embodiment, the control circuit 112a may include a fiber optic transmitter configured to communicate the content signals as fiber optic signals via a fiber optic cable 120a and, in some embodiments, a fiber patch (not illustrated), and/or any other fiber optic components that would be apparent to in of skill in the art in possession of the present disclosure. The fiber optic signals may be received by a fiber receiver 122a. When passed on the fiber optic cable 120a from the control circuit 112a to the fiber receiver 122a, the content signals generated by the control circuit 112a from the wireless signals 105 received by various satellites may be multiplexed together and demultiplexed at the fiber receiver 122a to be provided on the one or more trunk cables 124a.

The fiber receiver 122a may be configured to convert the content signals that are provided as the fiber optic signals on the fiber optic cable 120a to one or more electrical signals that are provided to the one or more trunk cables 124a (e.g., coaxial cables and/or any other electrical cables that would be apparent to one of skill in the art in possession of the present disclosure). The content signals provided as electrical signals on the one or more trunk cables 124a may be tapped by the trunk tap 118a. However, in other examples, the control circuit 112a may be configured to communicate the content signals provided as electrical signals via the one or more trunk cables 124a rather than use the fiber optic cable 120a and the fiber receiver 122a. The use of a fiber optic cable or an electrical cable may depend on the distance between the outside unit 110a and the trunk distribution system 116 as a greater distance between the outside unit 110a and the trunk distribution system 116 may require a fiber optic cable due to the amount of signal loss an electrical signal provided on an electrical cable will experience over that distance. The fiber optic cable also reduces the number of cables and the number of amplifiers that are need over the distance. However, fiber optic cables may be costlier to implement and are more susceptible to damage than electrical cables.

In the example illustrated in FIG. 1, the one or more trunk cables 124a includes trunk cables 124a(1), 124a(2), 124a(3), 124a(4), 124a(5), and up to 124a(6) that each receive portions of the content signal that is converted from a fiber optic signal to an electrical signal by the fiber receiver 122a. The trunk cables 124a(1)-124a(6) may be present because the primary satellite antenna 114a may receive wireless signals 105 from multiple satellites 102 that are in various orbital slots. Each trunk cable of the trunk cables 124a(1)-124a(6) may provide content signals from a respective signal source such as the satellite 102. While six cables are discussed and illustrated, more or fewer signal sources requiring more or few cables may be provided. In an example, a trunk cable 124a(1) of the one or more trunk cables 124a provides an 18 volt control signal that controls the communication of content signals from the 101 and 99 orbital slots. Another signal less than 14 volts, such as 13 volts, controls the right-hand polarization signals from the 101 orbital slot, which is provided on a trunk cable 124a(2) of the one or more trunk cables 124a. An 18 volt signal together with a 22 kHz signal may control the output from the 103, 110 and 119 orbital slot left hand polarized transponders of the 103, 110 and 119 orbital slots on a trunk cable 124a(3) of the one or more trunk cables 124a. A 13 volt control signal along with a 22 kHz AC control signal may control the passing of signals from the right hand polarized 103, 110 and 119 orbital slots on a trunk cable 124a(4) of the one or more trunk cables 124a. A trunk cable 124a(5) of the one or more trunk cables 124a may provide an 18 volt control signal that may control the passing of content signals from the left hand polarized 95 or 99RB/103RB orbital slots and an additional 18 volt control signal may control the passing of content signals from the right hand polarized 95 or 99RB/103RB orbital slots on a trunk cable 124a(6) of the trunk cables 124a.

In the illustrated embodiment of FIG. 1, the trunk tap 118a may be coupled to a switch device 126 and one or more signal sensors. The signal sensors may be configured to measure signal characteristics (e.g., signal quality) of the content signals provided on trunk cables 124a. In the illustrated example, the one or more signal sensors may be included in one or more monitoring set-top box receivers (e.g., a monitoring set-top box receiver 128a(1), a monitoring set-top box receiver 128a(2), a monitoring set-top box receiver 128a(3), and/or up to a monitoring set-top box receiver 128a(4)). The monitoring set-top box receivers 128a(1)-128a(4) may be coupled to the trunk tap 118a via a multi-switch module 130a (e.g., a signal wire multi-switch (SWM)) that is used to multiplex content signals on one or more outputs and via a splitter 132a. In some examples, the multiplexed content signals may have channels such as frequency blocks that provide requested programming channels designated for use by a particular user receiver's tuner within the MDU 106. In some embodiments, the splitter 132a may be configured to split the multiplexed content signals to the monitoring set-top box receivers 128a(1)-128a(4). The number of monitoring set-top box receivers may depend on the number of trunk cables of the one or more trunk cables 124a that are providing the content signals to the trunk distribution system 116. For example, each of the trunk cables 124a(1)-124a(4) may provide all of the content signals while the trunk cables 124a(5)-124a(6) may not be necessary to provide the content. Thus, there may be four of the monitoring set-top box receivers 128a(1)-128a(4) such that each monitoring set-top box receiver 128a(1)-128a(4) may be tuned to a programming channel that is known to be on one of the trunk cables 124a(1)-124a(4). For example, the monitoring set-top box receiver 128a(1) may be tuned to a first programming channel that is known to be provided on the trunk cable 124a(1), the monitoring set-top box receiver 128a(2) may be tuned to a second programming channel that is known to be provided on the trunk cable 124a(2), the monitoring set-top box receiver 128a(3) may be tuned to a third programming channel that is known to be provided on the trunk cable 124a(3), and the monitoring set-top box receiver 128a(4) may be tuned to a fourth programming channel that is known to be provided on the trunk cable 124a(4). However, one skill in the art will recognize that other monitoring set-top box receivers may be included to monitor other trunk cables in the one or more trunk cables 124(a) and/or fewer monitoring set-top box receivers may be included to monitor fewer of the one or more trunk cables 124(a) and still benefit from the teachings of the present disclosure.

In the illustrated embodiment, the satellite signal switching system 108 includes an outdoor unit 110b that includes a control circuit 112b and a backup satellite antenna 114b (e.g., satellite dish) that receives the wireless signals 105 from the satellite 102. The backup satellite antenna 114b may be located at the MDU 106 at a separate location form the primary satellite antenna 114a or at a geographical location that is different than that of the MDU 106. For example, the backup satellite antenna 114b may be at a distance from the primary satellite antenna 114a that may result in different satellite signal qualities of the wireless signal 105 when there is a weather event near the primary satellite antenna 114a and/or the backup satellite antenna 114b. For example, the backup satellite antenna 114b may be 100 ft., 1000 ft., 2000 ft., 1 mi., 2 mi., 5 mi., 10 mi., 25 mi., 50 mi., or any other distance that would be apparent to one of skill in the art in possession of the present disclosure. Further distances may reduce the chances that the same weather event or interfering condition that is affecting the primary satellite antenna 114a is affecting the backup satellite antenna 114b.

In the illustrated embodiment, the control circuit 112b controls the content signals received from the backup satellite antenna 114b and passes the communication of the content signals to the trunk distribution system 116 downstream from the backup satellite antenna 114b. For example, the control circuit 112b may be coupled to a trunk tap 118b. More specifically, the control circuit 112b may include a fiber optic transmitter configured to communicate the content signals as fiber optic signals via a fiber optic cable 120b and, in some embodiments, a fiber patch (not illustrated) and/or any other fiber optic components that would be apparent to in of skill in the art in possession of the present disclosure. The fiber optic signals may be received by a fiber receiver 122b. When passed on the fiber optic cable 120b from the control circuit 112b to the fiber receiver 122b, the content signals generated by the control circuit 112b from wireless signals 105 received by various satellites may be multiplexed together at the control circuit 112b and demultiplexed at the fiber receiver 122b.

The fiber receiver 122b may be configured to convert the content signals that are provided as the fiber optic signals on the fiber optic cable 120b to one or more electrical signals that are provided to one or more trunk cables 124b (e.g., coaxial cables and/or any other electrical cables that would be apparent to one of skill in the art in possession of the present disclosure). The content signals provided as electrical signals on the one or more trunk cables 124b may be tapped by the trunk tap 118b. However, in other examples, the control circuit 112b may be configured to communicate the content signals provided as electrical signals via the one or more trunk cables 124b that provide the content signals to the trunk tap 118b rather than use the fiber optic cable 120b and the fiber receiver 122b.

In the example illustrated in FIG. 1, the one or more trunk cables 124b include trunk cables 124b(1), 124b(2), 124b(3), 124b(4), 124b(5), and/or up to 124b(6) that receive the content signal that is converted from a fiber optic signal to an electrical signal by the fiber receiver 122b. Similar to the trunk cables 124a(1)-124a(6), the trunk cables 124b(1)-124b(6) may be present because the satellite antenna 114 may receive wireless signals 105 from multiple satellites 102 that are in various orbital slots. Each trunk cable of the trunk cables 124b(1)-124b(6) may provide content signals from a respective signal source such as the satellite 102. While six trunk cables are discussed and illustrated, more or fewer wireless signal sources require more or fewer trunk cables. In an example, a trunk cable 124b(1) of the one or more trunk cables 124b provides an 18 volt control signal that controls the communication of content signals from the 101 and 99 orbital slots. Another signal less than 14 volts, such as 13 volts, controls the right-hand polarization signals from the 101 orbital slot, which is provided on a trunk cable 124b(2) of the one or more trunk cables 124b. An 18 volt signal together with a 22 kHz signal may control the output from the 103, 110 and 119 orbital slot left hand polarized transponders of the 103, 110 and 119 orbital slots on a trunk cable 124b(3) of the one or more trunk cables 124b. A 13 volt control signal along with a 22 kHz AC control signal may control the passing of signals from the right hand polarized 103, 110 and 119 orbital slots on a trunk cable 124b(4) of the one or more trunk cables 124b. A trunk cable 124b(5) of the one or more trunk cable 124b may provide an 18 volt control signal that may control the passing of content signals from the left hand polarized 95 or 99RB/103RB orbital slots and an additional 18 volt control signal may control the passing of content signals from the right hand polarized 95 or 99RB/103RB orbital slots on a trunk cable 124b(6) of the trunk cables 124b.

In the illustrated embodiment of FIG. 1, the trunk tap 118b may be coupled to a switch device 126 and one or more signal sensors. The one or more signal sensors may be configured to measure signal characteristics (e.g., signal quality) of the content signals provided on the one or more trunk cables 124b. In the illustrated example, the one or more signal sensors may be included in one or more monitoring set-top box receivers (e.g., a monitoring set-top box receiver 128b(1), a monitoring set-top box receiver 128b(2), a monitoring set-top box receiver 128b(3), and/or up to a monitoring set-top box receiver 128b(4). The monitoring set-top box receivers 128b(1)-128b(4) may be coupled to the trunk tap 118b via a multi-switch module 130b that is used to multiplex content signals on one or more outputs and via a splitter 132b. In some examples, the multiplexed content signals may have channels such as frequency blocks that provide requested programming channels designated for use by a particular user receiver's tuner within the MDU 106. In some embodiments, the splitter 132b may be configured to split the multiplexed content signals to the one or more monitoring set-top box receivers 128b(1)-128b(4). The number of monitoring set-top box receivers may depend on the number of trunk cables of the one or more trunk cables 124b that are providing the content signals to the trunk distribution system 116. For example, each of the trunk cables 124b(1)-124b(4) may provide all of the content signals while the trunk cables 124b(5)-(6) may not be necessary to provide the content. Thus, there may be four of the monitoring set-top box receivers 128b(1)-128b(4) such that each monitoring set-top box receiver 128b(1)-128b(4) may be tuned to a programming channel that is known to be on one of the trunk cables 124b(1)-124b(4). For example, the monitoring set-top box receiver 128b(1) may be tuned to a first programming channel that is known to be provided on the trunk cable 124b(1), the monitoring set-top box receiver 128b(2) may be tuned to a second programming channel that is known to be provided on the trunk cable 124b(2), the monitoring set-top box receiver 128b(3) may be tuned to a third programming channel that is known to be provided on the trunk cable 124b(3), and the monitoring set-top box receiver 128b(4) may be tuned to a fourth programming channel that is known to be provided on the trunk cable 124b(4). However, one skill in the art will recognize that other monitoring set-top boxes may be included to monitor other trunk cables in the one or more trunk cables 124b and/or fewer monitoring set-top boxes may be included in the satellite signal switching system 108 to monitor fewer of the one or more of the trunk cables 124b and still benefit from the teachings of the present disclosure. In various embodiments, the programming channel that the monitoring set-top box receiver 128b(1) is tuned to may be the same programming channel that the monitoring set-top box receiver 128a(1) is tuned to. Likewise, the programming channels that the monitoring set-top box receivers 128b(2)-

128b(4) are tuned to may be the same programming channels that the monitoring set-top box receivers 128a(2)-128a(4) are tuned to, respectively.

In the embodiment illustrated in FIG. 1, the satellite signal switching system 108 may include a video matrix switch 134 that is coupled to each of the monitoring set-top box receivers 128a(1)-128a(4) and that is coupled to each of the monitoring set-top box receivers 128b(1)-128b(4). The video matrix switch 134 may be configured to receive a video feed from each of the monitoring set-top box receivers 128a(1)-128a(4) and 128b(1)-128b(4) and combine the video feeds from each of the monitoring set-top box receivers 128a(1)-128a(4) and 128b(1)-128b(4) into a video matrix 136 that may be provided on for display on a display device 138. In some embodiments, the display device 138 and the video matrix switch 134 may be combined components or separate components. For example, the display device 138 may be integrated into the video matrix switch 134 or may be a television, a projector/projector screen, a computer monitor, and/or any other display device that would be apparent to one of skill in the art in possession of the present disclosure that is separate from the video matrix switch 134.

The satellite signal switching system 108 may include a content signal switching controller 140. The content signal switching controller 140 may be coupled to the video matrix switch 134. However, in some embodiments, the content signal switching controller 140 and the video matrix switch 134 may be combined into a single chassis. In the illustrated embodiment, the content signal switching controller 140 may be coupled the video matrix switch 134 and receive the video matrix 136 from the video matrix switch 134 and/or signal information from each of the monitoring set-top box receivers 128a(1)-128a(4) and 128b(1)-128b(4) via the video matrix switch 134. In other embodiments, the content signal switching controller 140 may provide commands and/or other information to the video matrix switch 134 and/or to the monitoring set-top box receivers 128a(1)-128a(4) and 128b(1)-128b(4) via the video matrix switch 134. In some embodiments, the content signal switching controller 140 may be coupled to the video matrix switch 134 over a network 142 and/or via a direct connection. The network 142 may be implemented by an example mobile cellular network, such as a long-term evolution (LTE) network or other third generation (3G), fourth generation (4G) wireless network, or fifth-generation (5G) wireless network. However, in some examples, the network 142 may be additionally or alternatively be implemented by one or more other communication networks, such as, but not limited to, a satellite communication network, a microwave radio network, any wired network, any local area network, any wide area network (e.g., the Internet) and/or other communication networks that would be apparent to one of skill in the art in possession of the present disclosure.

In various embodiments, the content signal switching controller 140 may be coupled to each of the monitoring set-top box receivers 128a(1)-128a(4) and 128b(1)-128b(4) via communication cables (not illustrated) directly or via the network 142. For example, the set-top box receivers 128(1)-128a(4) and 128b(1)-128b(4) may include serial ports from which signal information may be queried from. Each serial port of the set-top box receivers 128(1)-128a(4) and 128b(1)-128b(4) may be coupled to a network-to-serial adapter (not illustrated) (e.g., a serial device server such as an NPort 5600 Series 8 and 16-port RS-232/422/485 manufactured by Moxa® of New Taipei City, Taiwan, R.O.C.) that provides an interface between the serial ports of the set-top box receivers 128(1)-128a(4) and 128b(1)-128b(4) and the network 142. The content signal switching controller 140 may also be coupled to the switch device 126 via the network 142 and/or directly via a communication cable. However, in some embodiments the content signal switching controller 140 and the switch device 126 may be combined into a single chassis. The content signal switching controller 140 may be accessible via the network 142 by a remote monitoring device 144 that may be used by a user to remotely monitor the satellite signal switching system 108 and provide instructions to the content signal switching controller 140 that can provide instructions to the various components of the satellite signal switching system 108.

As discussed above, the satellite signal switching system 108 includes the switch device 126 that is coupled to the trunk tap 118a and the trunk tap 118b and configured to receive the content signals from each of the primary satellite antenna 114a and the backup satellite antenna 114b. The switch device 126 may include a switch or switching circuit configured to provide the content signals that originate from the primary satellite antenna 114a or that originate from the backup satellite antenna 114b to the trunk distribution system 116. The switch device 126 switches between the content signals that originate from the primary satellite antenna 114a or that originate from the backup satellite antenna 114b based on commands/instructions received from the content signal switching controller 140.

In various embodiments, the trunk distribution system 116 may include a plurality of components that provide the content signals from the switch device 126 to set-top box receivers within the MDU 106 that are coupled to display devices that display content for a programming channel that each set-top box receiver is tuned to. As such, the trunk distribution system 116 may include one or more trunk amplifies, trunk taps, one or more multi-switch modules, one or more fiber transceivers and/or receivers, one or more splitters, and/or any other trunk distribution component that would be apparent to one of skill in the art in possession of the present disclosure. As such, while a specific content distribution system 100 has been illustrated and described, one of skill in the art in possession of the present disclosure will recognize that the satellite signal switching system 108 of the present disclosure may utilize a variety of other components and component configurations while remaining within the scope of the present disclosure as well.

Figure 2:
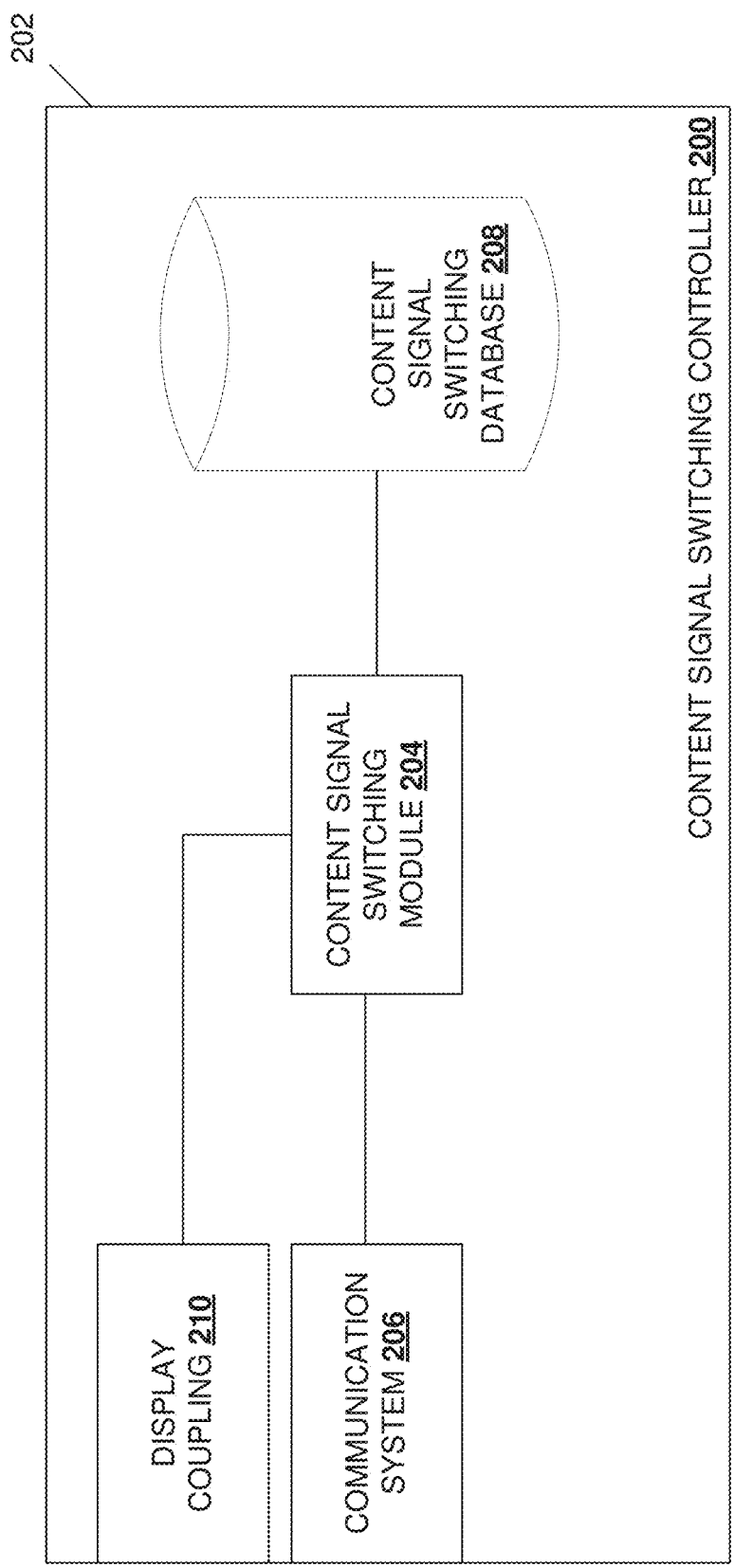
FIG. 2 is a schematic view illustrating an embodiment of a content signal switching controller using in the content distribution system of FIG. 1.

Referring now to FIG. 2, an embodiment of a content signal switching controller 200 is illustrated that may be the content signal switching controller 140 discussed above with reference to FIG. 1. In the illustrated embodiment, the content signal switching controller 200 includes a chassis 202 that houses the components of the content signal switching controller 200. Several of these components are illustrated in FIG. 2. For example, the chassis 202 may house a processing system (not illustrated) and a non-transitory memory system (not illustrated) that includes instructions that, when executed by the processing system, cause the processing system to provide a content signal switching module 204 that is configured to perform the functions of the content signal switching module and/or the content signal switching controller discussed below.

The chassis 202 may further house a communication system 206 that is coupled to the content signal switching module 204 (e.g., via a coupling between the communication system 206 and the processing system). The communication system 206 may include software or instructions that are stored on a computer-readable medium and that allow the content signal switch controller 200 to send and receive information through the communication networks discussed above. For example, the communication system 206 may include a first communication interface to provide communications through the network 142 and/or various components of the satellite signal switching system 108 as detailed above (e.g., first (e.g., long-range) transceiver(s)). In an embodiment, the first communication interface may be a wireless antenna that is configured to provide communications with IEEE 802.11 protocols (Wi-Fi), cellular communications, satellite communications, other microwave radio communications and/or communications. The communication system 206 may also include a second communication interface that is configured to provide direct communication with other user devices, sensors, storage devices, and other devices within the satellite signal switching system 108 discussed above with respect to FIG. 1 (e.g., second (e.g., short-range) transceiver(s)). For example, the second communication interface may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices. The communication system 206 may also include a network interface controller (NIC), and/or any other wired interface that would be apparent to one of skill in the art in possession of the present disclosure.

The chassis 202 may also house a storage system (not illustrated) that is coupled to the content signal switching module 204 (e.g., via a coupling between the storage system and the processing system) and that includes a content signal switching database 208 that is configured to store any of the signal information utilized by the content signal switching module 204 discussed below. The chassis 202 also houses a display coupling 210 that is coupled to the content signal switching module 204 (e.g., via a coupling between the processing system and the display coupling 210). In an embodiment, the display coupling 210 may be provided by an external connector (e.g., that is configured to connect to the display device 138 via a display cable, configured to connect directly to an external connector on the display device 138, etc.), an internal connector (e.g., between the processing system and the display device 138 that is integrated with the content signal switching controller 200 and includes a display screen), an image projection component (e.g., a projector lens), and/or a variety of other display couplings that would be apparent to one of skill in the art in possession of the present disclosure. While a specific content signal switch controller 200 has been illustrated and described, one of skill in the art in possession of the present disclosure will recognize that content signal switch controllers (or other devices operating according to the teachings of the present disclosure in a manner similar to that described below for the content signal switch controller 200) may include a variety of components and/or component configurations for providing the functionality discussed below, while remaining within the scope of the present disclosure as well.

Figure 3:
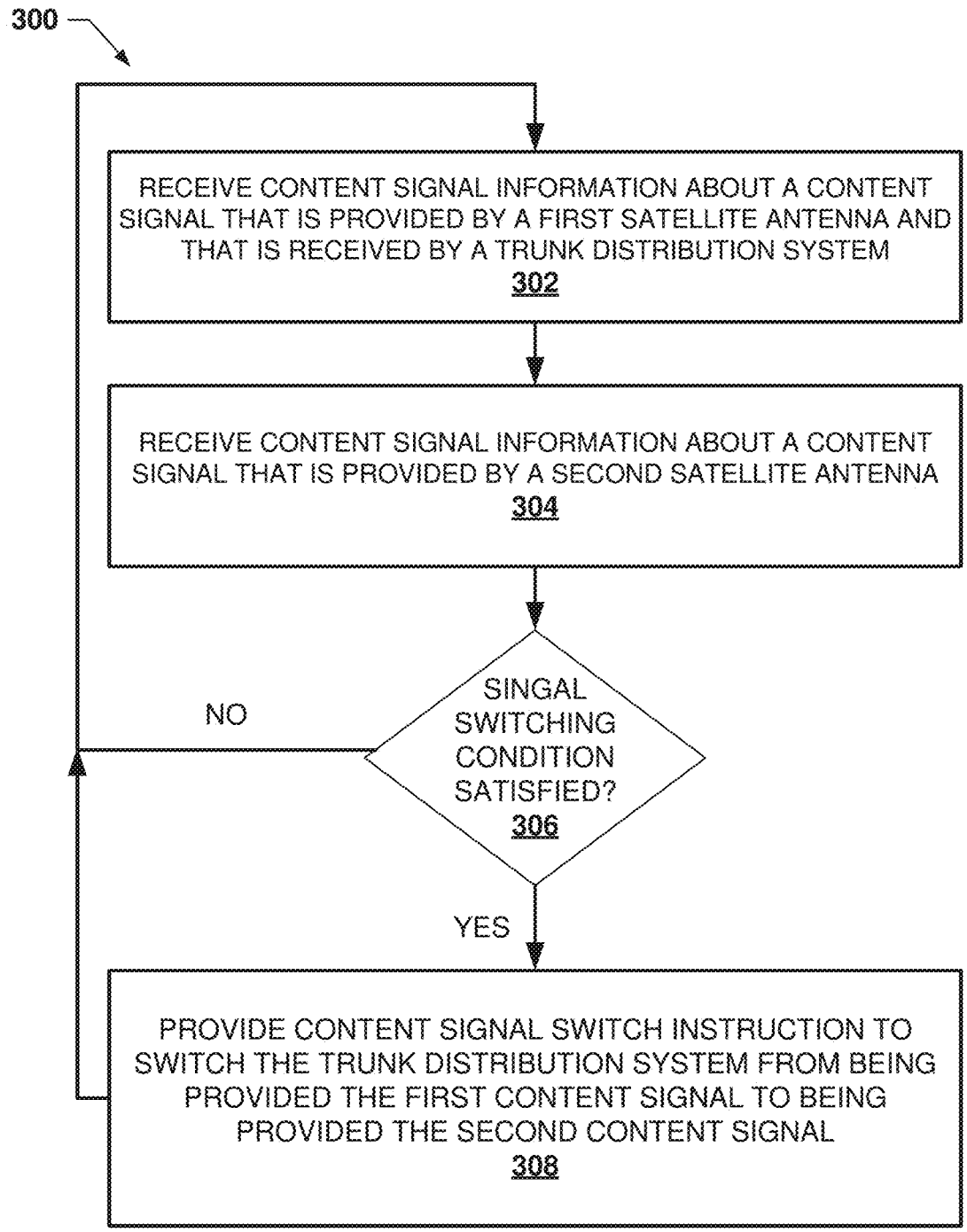
FIG. 3 is a flow chart illustrating an embodiment of a method of satellite signal switching.

Referring now to FIG. 3, an embodiment of a method 300 of satellite signal switching is illustrated. The method 300 will be discussed in reference to the FIGS. 1 and 2 above and FIGS. 4A and 4B, 5A and 5B that illustrate processes and screen shots of the satellite signal switching system 108 of FIG. 1. The method 300 begins at block 302 where content signal information about a content signal that provided by a first satellite antenna and that received by a trunk distribution system are received. In an embodiment of block 302 and referring to a content distribution system 400 of FIG. 4A that may be the content distribution system 100 of FIG. 1, the primary satellite antenna 114a may receive the wireless signal(s) 105 and the control circuit 112a may provide a content signal 402 to the switch device 126. In the illustrated example, the content signal may be provided to the switch device 126 via the fiber optic cable 120a, the fiber receiver 122a, the one or more trunk cables 124a, and the trunk tap 118a. The switch device 126 may be configured to provide the content signal 402 to the trunk distribution system 116 such that the content signal 402 may be provided to set-top box receivers throughout the MDU 106 such that those set-top box receivers can provide the content for display on a display device for the end user. The content signal 402 may also be provided, via the trunk tap 118a, to one or more content signal sensors such as the monitoring set-top box receivers 128a(1)-128a(4). In the illustrated embodiment, the content signal 402 may be provided to each of the monitoring set-top box receivers 128a(1)-128a(4) via the multi-switch module 130a and the splitter 132a from the trunk tap 118a.

While the content signal 402 is discussed as a single content signal, one of skill in the art in possession of the present disclosure will recognize that the content signal 402 may include multiple signals as the content signal 402 is provided through the satellite signal switching system 108. For example, the content signal 402 may be multiplexed, split, tapped, experience loss, amplified, demultiplexed, converted from fiber to electrical, from electrical to fiber, and/or experience other transformations as the content signal 402 is provided through the satellite signal switching system 108 that would be apparent to one of skill in the art in possession of the present disclosure. As such, the content signal 402 may include a plurality of different signals but is referred to as the content signal 402 for simplicity. Also, as discussed above, one of skill in the art will recognize that the content signal 402 may include a plurality of sub-content signals depending on wireless signal(s) 105 received from the satellite(s) 102.

In an embodiment of block 302, the content signal switching controller 140 may receive content signal information associated with the content signal 402 from each of the signal sensors, such as those included in the monitoring set-top box receivers 128a(1)-128a(4). As discussed above, one or more monitoring set-top box receivers may be tuned to a programming channel that is known to be provided on the one or more trunk cables 124a. In the illustrated embodiment, each of the monitoring set-top box receivers 128a(1)-128a(4) may be tuned to a programming channel that is provided on the trunk cables 124a(1), 124a(2), 124a(3), and 124a(4), respectively. By having a dedicated monitoring set-top box receiver for each of the trunk cables 124a(1)-124a(4), more accurate content signal information can be retrieved.

In an embodiment, the content signal switching controller 140 may be coupled to a data port serial protocol interface on each of the monitoring set-top box receivers 128a(1)-128a(4) via the network-to-serial adapter, which allows the content signal switch controller 140 to communicate over a communication port included on the communication system 206 with each monitoring set-top box receiver 128a(1)-128a(4) to read out content signal information that includes a monitoring set-top box receiver identifier, a current programming channel that the monitoring set-top box receiver is tuned to, and a signal quality value (percentage) of the content signal 402 being provided to the monitoring set-top box receiver, and/or any other content signal information that would be apparent to one of skill in the art in possession of the present disclosure. The connection between the content signal switching controller 140 and the monitoring set-top box receivers 128*a*(1)-128*a*(4) also allows the content signal switching controller 140 to send commands to force the monitoring set-top box receivers 128*a*(1)-128*a*(4) to a particular programming channel. The content signal switching controller 140 can ensure the satellite signal switching system 108 remains in a consistent state (e.g., that no monitoring set-top box receiver 128*a*(1)-128*a*(4) is turned off or tuned to an incorrect programming channel), and thus receive content signal information on the incorrect programming channel. The content signal switching controller 140 then continuously polls each of the monitoring set-top box receivers 128*a*(1)-128*a*(4) for content signal information and stores the content signal information in the content signal switching database 208. In various embodiments, the content signal switching controller 140 polls each of the monitoring set-top box receivers 128*a*(1)-128*a*(4) at a predetermined interval (e.g., every 1 second, 2 seconds, 5 seconds, 10 seconds, and/or any other interval that would be apparent to one of skill in the art in possession of the present disclosure).

The method 300 proceeds to block 304 where content signal information about a content signal provided by a second satellite antenna is received. In an embodiment of block 304 and referring to the content distribution system 400 of FIG. 4A, the backup satellite antenna 114*b* may receive the wireless signal 105 and the control circuit 112*b* may provide a content signal 404 to the switch device 126. In the illustrated example, the content signal 404 may be provided to the switch device 126 via the fiber optic cable 120*b*, the fiber receiver 122*b*, the one or more trunk cables 124*b*, and the trunk tap 118*b*. Because the switch device 126 is providing the content signal 402 to the trunk distribution system 116, the content signal 404 may be dropped or otherwise blocked at the switch device 126.

The content signal 404 may also be provided, via the trunk tap 118*b*, to one or more content signal sensors such as those included in the monitoring set-top box receivers 128*b*(1)-128*b*(4). In the illustrated embodiment, the content signal 404 may be provided to each of the monitoring set-top box receivers 128*b*(1)-128*b*(4), via the multi-switch module 130*b* and the splitter 132*b*, from the trunk tap 118*b*. While the content signal 404 is discussed as a single content signal, one of skill in the art in possession of the present disclosure will recognize that the content signal 404 may include multiple signals as the content signal 404 is provided through the satellite signal switching system 108. For example, the content signal 404 may be multiplexed, split, tapped, experience loss, amplified, demultiplexed, converted from fiber to electrical, converted from electrical to fiber, and/or experience other transformations as the content signal 404 is provided through the satellite signal switching system 108 that would be apparent to one of skill in the art in possession of the present disclosure. As such, the content signal 404 may include a plurality of different signals but is referred to as the content signal 404 for simplicity. Also, as discussed above, one of skill in the art will recognize that the content signal 404 may include a plurality of sub-content signals depending on wireless signal(s) 105 received from the satellite(s) 102.

In an embodiment of block 304, the content signal switching controller 140 may receive content signal information associated with the content signal 404 from each of the content signal sensors, such as those included in the monitoring set-top box receivers 128*b*(1)-128*b*(4), that are coupled to the backup satellite antenna 114*b*. As discussed above, one or more monitoring set-top box receivers may be tuned to a programming channel that is known to be provided on the one or more trunk cables 124*b*. In the illustrated embodiment, each of the monitoring set-top box receivers 128*b*(1)-128*b*(4) may be tuned to a programming channel that is provided on the trunk cables 124*b*(1), 124*b*(2), 124*b*(3), and 124*b*(4), respectively. By having a dedicated monitoring set-top box receiver for each of the trunk cables 124*b*(1)-124*b*(4), more accurate content signal information can be retrieved.

In an embodiment, the content signal switching controller 140 may be coupled to a data port serial protocol interface on each of the monitoring set-top box receivers 128*b*(1)-128*b*(4 via the network-to-serial adapter), which allows the content signal switch controller 140 to communicate over a communication port with each monitoring set-top box receiver 128*b*(1)-128*b*(4) to read out content signal information that includes a monitoring set-top box receiver identifier, a current programming channel that the monitoring set-top box receiver is tuned to, and a signal quality value (percentage) of the content signal 404 being provided to the monitoring set-top box receiver, and/or any other content signal information that would be apparent to one of skill in the art in possession of the present disclosure. The connection between the content signal switching controller 140 and the monitoring set-top box receivers 128*b*(1)-128*b*(4) also allows the content signal switching controller 140 to send commands to force the monitoring set-top box receivers 128*b*(1)-128*b*(4) to a particular programming channel. The content signal switching controller 140 can ensure that the satellite signal switching system 108 remains in a consistent state (e.g., that no monitoring set-top box receiver 128*b*(1)-128*b*(4) is turned off or tuned to the wrong programming channel), and thus receive content signal information on an incorrect programming channel. The content signal switching controller 140 may then continuously poll each of the monitoring set-top box receivers 128*b*(1)-128*b* (4) for content signal information and stores the content signal information in the content signal switching database 208. The content signal information may be stored with a time at which the content signal information was received. In various embodiments, the content signal switching controller 140 polls each of the monitoring set-top box receivers 128*b*(1)-128*b*(4) at a predetermined interval (e.g., every 1 second, 2 seconds, 5 seconds, 10 seconds, and/or any other interval that would be apparent to one of skill in the art in possession of the present disclosure).

The method 300 then proceeds to decision block 306 where it is determined whether the first signal information and the second signal information satisfy a signal switching condition. In an embodiment of decision block 306, the content signal switching controller 140 may determine whether the first signal information and the second signal information satisfy a signal switching condition. In various embodiments, the first signal information and the second signal information may satisfy the signal switching condition when signal quality information included in the first signal information from one or more of the monitoring set-top box receivers 128*a*(1)-128*a*(4) is less than the signal quality information included in the second signal information from one or more monitoring set-top box receivers 128*b*(1)-128*b*(4). Specifically, the content signal switching module 204 may compare the signal quality information of the monitoring set-top box receiver 128*a*(1) to the signal quality information of the monitoring set-top box receiver 128*b*(1), which may be tuned to the same programming channel as the monitoring set-top box receiver 128a(1) is tuned to or tuned to a programming channel that is provided on the trunk cable 124b(1) that corresponds with the trunk cable 124a(1) that provides the programming channel for the monitoring set-top box receiver 128a(1). Similarly, the content signal switching module 204 may compare the signal quality information of the monitoring set-top box receiver 128a(2) to the signal quality information of the monitoring set-top box receiver 128b(2). The content signal switching module 204 may compare the signal quality information of the monitoring set-top box receiver 128a(3) to the signal quality information of the monitoring set-top box receiver 128b(3). The content signal switching module 204 may compare the signal quality information of the monitoring set-top box receiver 128a(4) to the signal quality information of the monitoring set-top box receiver 128b(4). If the signal quality information of more than the half of the monitoring set-top box receivers 128a(1)-128a(4) is less than the signal quality information of the monitoring set-top box receivers 128b(1)-128b(2), then the predetermined signal switching condition is satisfied. In other examples, if an average of a cumulation of the signal quality information of the monitoring set-top box receivers 128a(1)-128a(4) is less than an average of a cumulation of the signal quality information of the monitoring set-top box receivers 128b(1)-128b(2), then the predetermined signal switching condition is satisfied.

In other examples, the content signal switching module 204 may compare the sum of the signal quality information of the monitoring set-top box receivers 128a(1)-128a(4) to the sum of the signal quality information of the monitoring set-top box receivers 128b(1)-128b(4). If the sum of the signal quality information of the monitoring set-top box receivers 128a(1)-128a(4) is less than the sum of the signal quality information of the monitoring set-top box receivers 128b(1)-128b(4), then the predetermined signal switching condition is satisfied.

In yet other examples, the content signal switching module 204 may determine whether the signal quality information of one or more of the monitoring set-top box receivers 128a(1)-128a(4) is less than a first predetermined threshold (e.g., 50%, 60% or any other threshold that would be apparent to one of skill in the art) and whether the signal quality information of one or more of the monitoring set-top box receivers 128b(1)-128b(4) are above a second predetermined threshold (e.g., 50%, 60%, 70% or any other threshold that would be apparent to one of skill in the art in possession of the present disclosure). If the signal quality information of one or more of the monitoring set-top box receivers 128a(1)-128a(4) is less than a first predetermined threshold (e.g., 60%) and the signal quality of one or more of the monitoring set-top box receivers 128b(1)-128b(4) are greater that the second predetermined threshold (e.g., 70%) then the predetermine signal switching condition is satisfied.

In yet other examples, the content signal switching module 204 may determine whether the difference in signal quality information of one or more of the monitoring set-top box receivers 128a(1)-128a(4) and the signal quality information of one or more of the monitoring set-top box receivers 128b(1)-128b(4) satisfies a predetermined threshold. For example, if the difference between the signal quality information of the monitoring set-top box receiver 128a(1) and the signal quality information of the monitoring set-top box receivers 128b(1) is greater than a predetermined threshold of 20 percentage points (e.g., the monitoring set-top box receiver 128a(1) has a 70% signal quality and the monitoring set-top box receiver 128b(1) has a 90% signal quality) or any other predetermined threshold that would be apparent to one of skill in the art in possession of the present disclosure, then the signal switching condition is satisfied. In other examples, if the difference between the cumulative signal quality of more than one of the monitoring set-top box receivers 128a(1)-128a(4) and the cumulative signal quality of more than one of the monitoring set-top box receivers 128b(1)-128b(4) satisfies a predetermined threshold, then the signal switching condition is satisfied. For example, the predetermined threshold may be 80 percentage points, all of the monitoring set-top box receivers 128a(1)-128a(4) have a signal quality of 60% and the all of the monitoring set-top box receivers 128a(1)-128a(4) have a signal quality of 81%. Thus, the cumulative signal quality of all of the monitoring set-top box receivers 128a(1)-128a(4) is 240 and the cumulative signal quality of all of the monitoring set-top box receivers 128b(1)-128b(4) is 324 making the difference between them 84, which satisfies the predetermined condition of 80 percentage points, and therefore the signal switching condition is satisfied.

In various embodiments of the examples described above, the content signal switching module 204 may maintain a counter to avoid the signal switching condition being satisfied when intermittent conditions are present or when the first signal information and the second signal information briefly satisfy the predetermined conditions above but do not satisfy the predetermined condition shortly thereafter, which avoids excessive switching between the content signal 402 and 404 being provided to the trunk distribution system 116. For example, the signal switching condition may be satisfied when the counter reaches a count of 20 or any other predetermined count that would be apparent to one of skill in the art in possession of the present disclosure. The counter may increment the count by 2 when the first signal information and/or the second signal information satisfy a predetermined condition in any of the examples above and decrease the count by 1 when the first signal information and/or the second signal information do not satisfy the predetermined condition in those examples. The content signal switching module 204 does this for every instance that the first signal information and the second signal information received, which may be polled once every 5 seconds or other interval that would be apparent to one of skill in the art in possession of the present disclosure. Thus, 10 sequential signal events where the predetermined thresholds are satisfied would reach the counter of 20, which would take 50 seconds to make a determination that the signal switching condition is satisfied.

In yet other embodiments, the signal switching condition may be satisfied when errors, failures, and/or other events are detected at one or more of the monitoring set-top box receivers 128a(1)-128(4) that indicate that something is wrong with the components (e.g., the primary satellite antenna 114a, the control circuit 112a, the fiber optic cable 120a, the trunk tap 118a, and/or any of the one or more trunk cables 124a) that provide the content signal 402 to the trunk distribution system 116. In yet other examples, the content signal switching module 204 may monitor a timer that when expired satisfies a signal switching condition. In various examples, the timer may be activated when the switch device 126 begins providing the content signal 404 originating from the backup satellite antenna 114b to the trunk distribution system 116 so that the backup satellite antenna 114b is not perpetually providing the content signals 404 to the trunk distribution system 116. In other examples, the content signal switching module 204 may monitor a clock such that when the clock reaches a predetermined time (e.g., a reset time each day), the signal switching condition is satisfied. In various examples, the monitoring of the clock may be activated when the switch device 126 begins providing the content signal 404 originating from the backup satellite antenna 114*b* to the trunk distribution system 116 so that the backup satellite antenna 114*b* is not perpetually providing the content signals 404 to the trunk distribution system 116.

In yet other embodiments, the signal switching condition may be satisfied when a signal switch manual instruction is received from a user to switch the content signal being provided to the trunk distribution system 116 from the content signal 402 to the content signal 404. For example, and with reference to FIGS. 5A and 5B, a display device 500, which may be the display device 138 of FIG. 1, may include a display screen 502 that displays a video matrix 504, which may be the video matrix 136 of FIG. 1. However, in other embodiments, the display device 500 may be a display device that is coupled to or included in the remote monitoring device 144 that is coupled to the content signal switching controller 140 via the network 142. The video matrix 504 may include a plurality of video feeds that originate from the primary satellite antenna 114*a* via the monitoring set-top box receivers 128*a*(1)-128*a*(4). For example, a video feed 504*a* may be provided by the monitoring set-top box receiver 128*a*(1), a video feed 504*b* may be provided by the monitoring set-top box receiver 128*a*(2), a video feed 504*c* may be provided by the monitoring set-top box receiver 128*a*(3), and/or a video feed 504*d* may be provided by the monitoring set-top box receiver 128*a*(4). Similarly, corresponding video feeds originating from the backup satellite antenna 114*b* may be included in the video matrix 504. For example, a video feed 504*e* may be provided by the monitoring set-top box receiver 128*b*(1), a video feed 504*f* may be provided by the monitoring set-top box receiver 128*b*(2), a video feed 504*g* may be provided by the monitoring set-top box receiver 128*b*(3), and a video feed 504*h* may be provided by the monitoring set-top box receiver 128*b*(4).

The display screen 502 may also display a signal switcher control graphical user interface (GUI) 506 that is provided by the content signal switching module 204 of the content signal switching controller 200. The signal switcher control GUI 506 may include a signal graph 508 that includes a primary satellite antenna feed plot 508*a* that illustrates the average signal qualities of the content signal 402 at the monitoring set-top box receivers 128*a*(1)-128*a*(4) over time. The signal graph 508 may also include a backup satellite antenna feed plot 508*b* that illustrates the average signal qualities of the content signal 404 at the monitoring set-top box receivers 128*b*(1)-128*b*(4) over time. The signal switcher control GUI 506 may also include a current signal quality GUI 510 that displays the current signal quality of each of the video feeds 504*a*-504*h* from the monitoring set-top box receivers 128*a*(1)-128*a*(4) and 128*b*(1)-128*b*(4).

The signal switcher control GUI 506 may also may include one or more signal switcher control buttons 512*a* and/or 512*b* or other user input mechanism (e.g., a control line interface, and the like) for a user to provide the signal switch manual instruction. For example, a user may select the signal switcher control button 512*a* when the user wants the content signal 402 to be provided to the trunk distribution system 116 or the user may select the signal switcher control button 512*b* when the user wants the content signal 404 to be provided to the trunk distribution system 116. The user may use the video matrix 504 and the signal switcher control GUI 506 to determine when to provide the signal switch manual instruction which satisfies the content signal switching condition. For example, the user may notice that the video feeds 504*a*-504*d* all include an error message 514*a*, 514*b*, 514*c*, and/or 514*d*, respectively, such as a "searching for satellite signal" (SFSS) OSD. The use may also notice that the primary satellite antenna feed plot 508*a* has dropped to 0% indicating a lost content signal. The user may then select the signal switcher control button 512*b* to provide the signal switch manual instruction to the content signal switching controller 140 that instructs the content signal switching controller 140 to provide the content signal 404 to the trunk distribution system 116.

While specific examples of the content signal switching controller 200 determining whether the first signal information and the second signal information satisfy the signal switching condition are described herein, one of skill in the art in possession of the present disclosure will recognize that a wide variety of other predetermined conditions and monitoring techniques will fall within the scope of the present disclosure. Furthermore, while the above examples discuss situations where the content signal 402 is being provided to the trunk distribution system 116 indicating that the primary satellite antenna 114*a* is active and the backup satellite antenna 114*b* is inactive, one of skill in the art in possession of the present disclosure, will recognize that the backup satellite antenna 114*b* may be active (e.g., providing the content signal 404 to the trunk distribution system 116) and the above examples may be used to determine whether to make the primary satellite antenna 114*a* active.

Figure 4A:
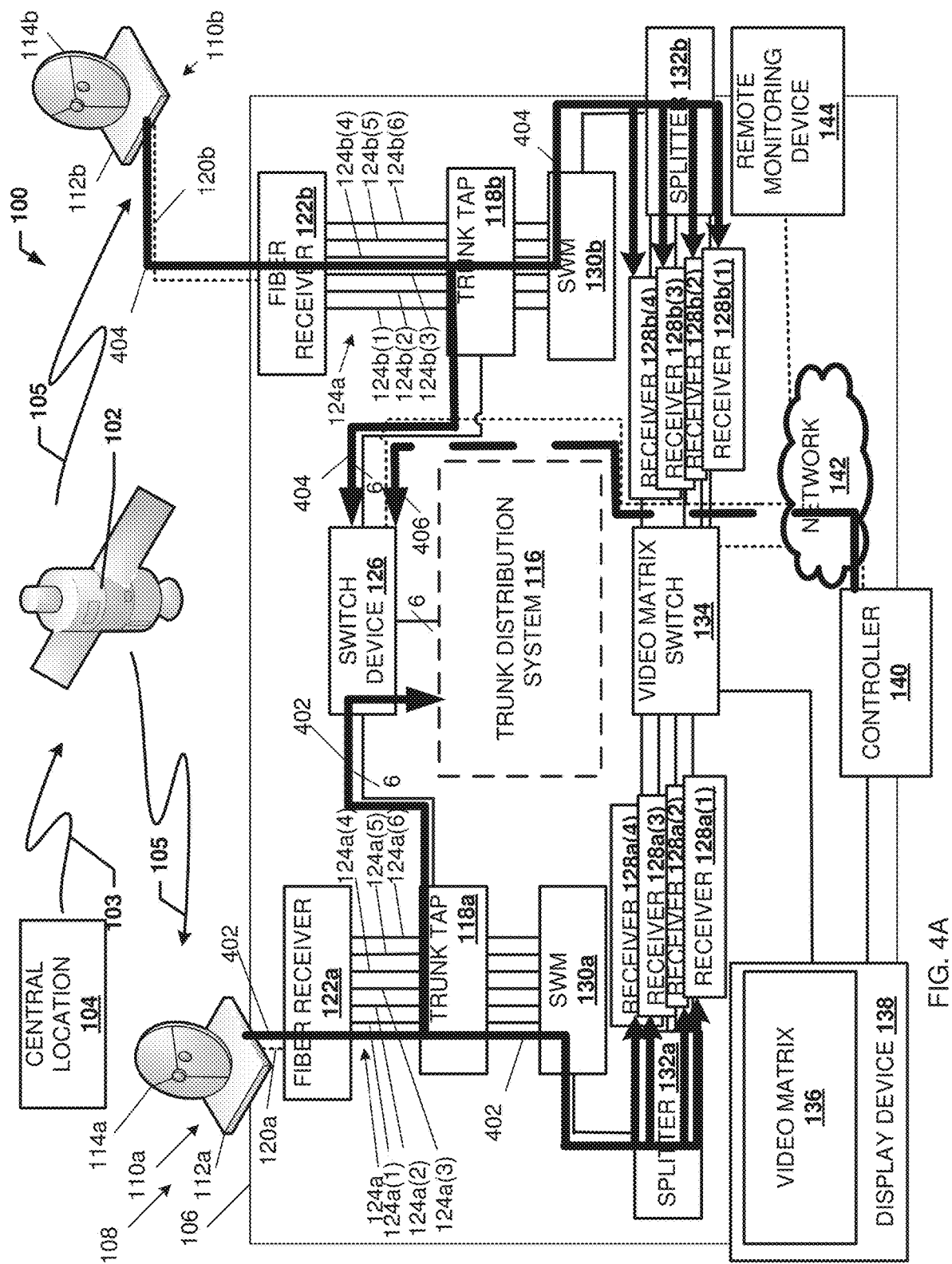
FIG. 4A is a schematic view illustrating an embodiment of the content distribution system of FIG. 1 during the method of satellite signal switching of FIG. 3.
Figure 4B:
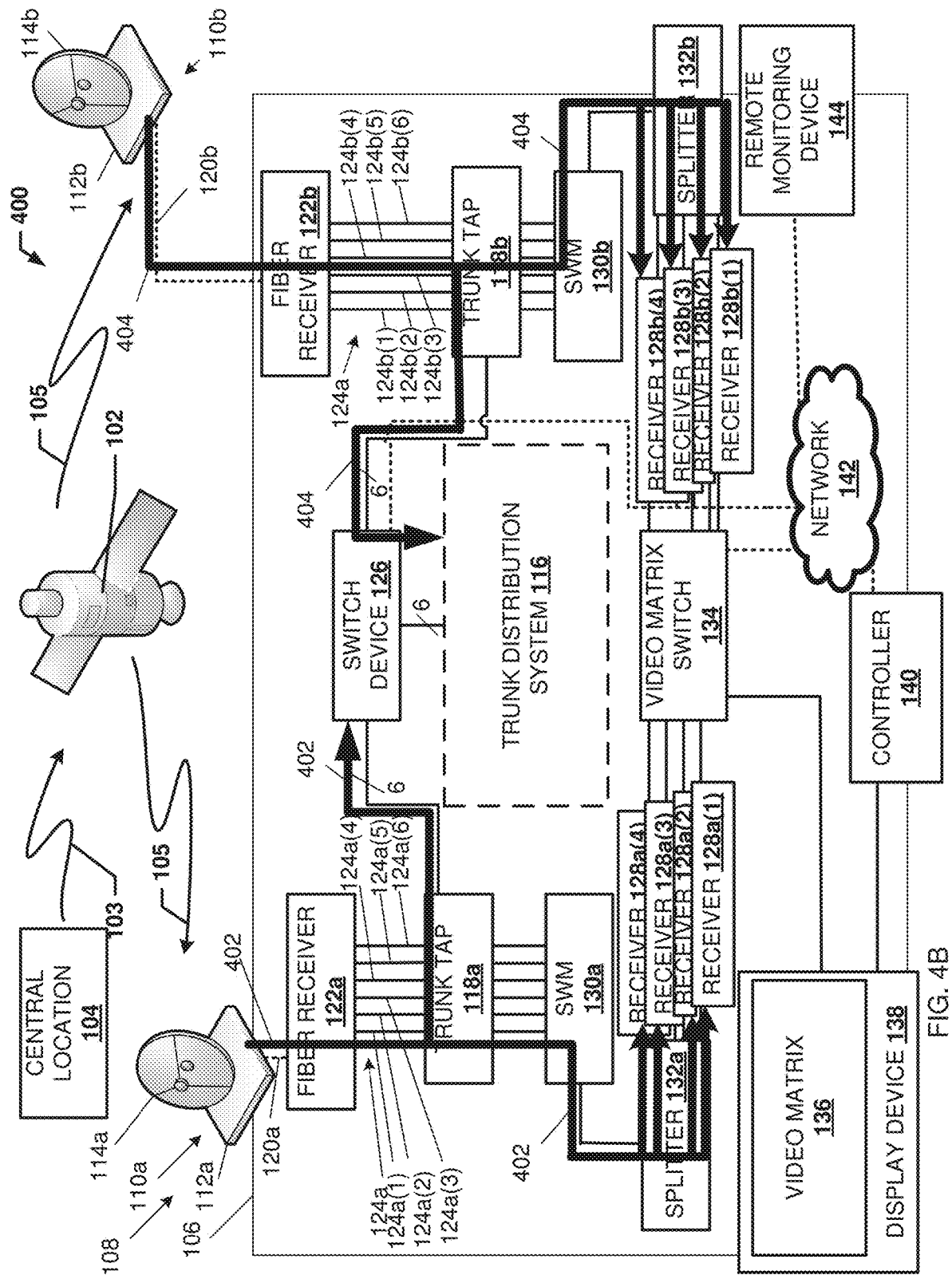
FIG. 4B is a schematic view illustrating an embodiment of the content distribution system of FIG. 1 during the method of satellite signal switching of FIG. 3.
Figure 5A:
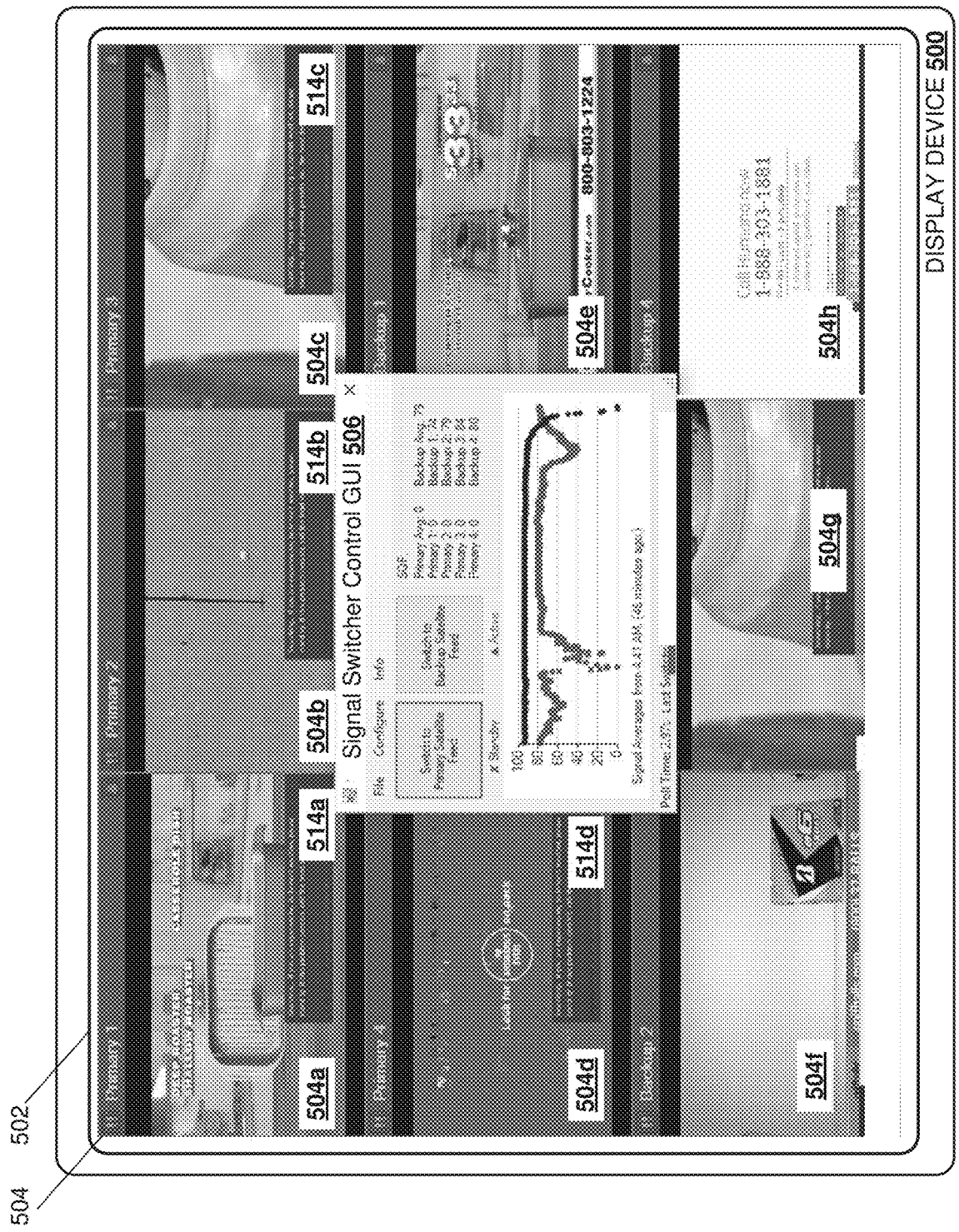
FIG. 5A is a screen shot illustrating an embodiment of a display device in the content distribution system of FIG. 1 displaying a video matrix and a signal switcher controller graphical user interface (GUI).
Figure 5B:
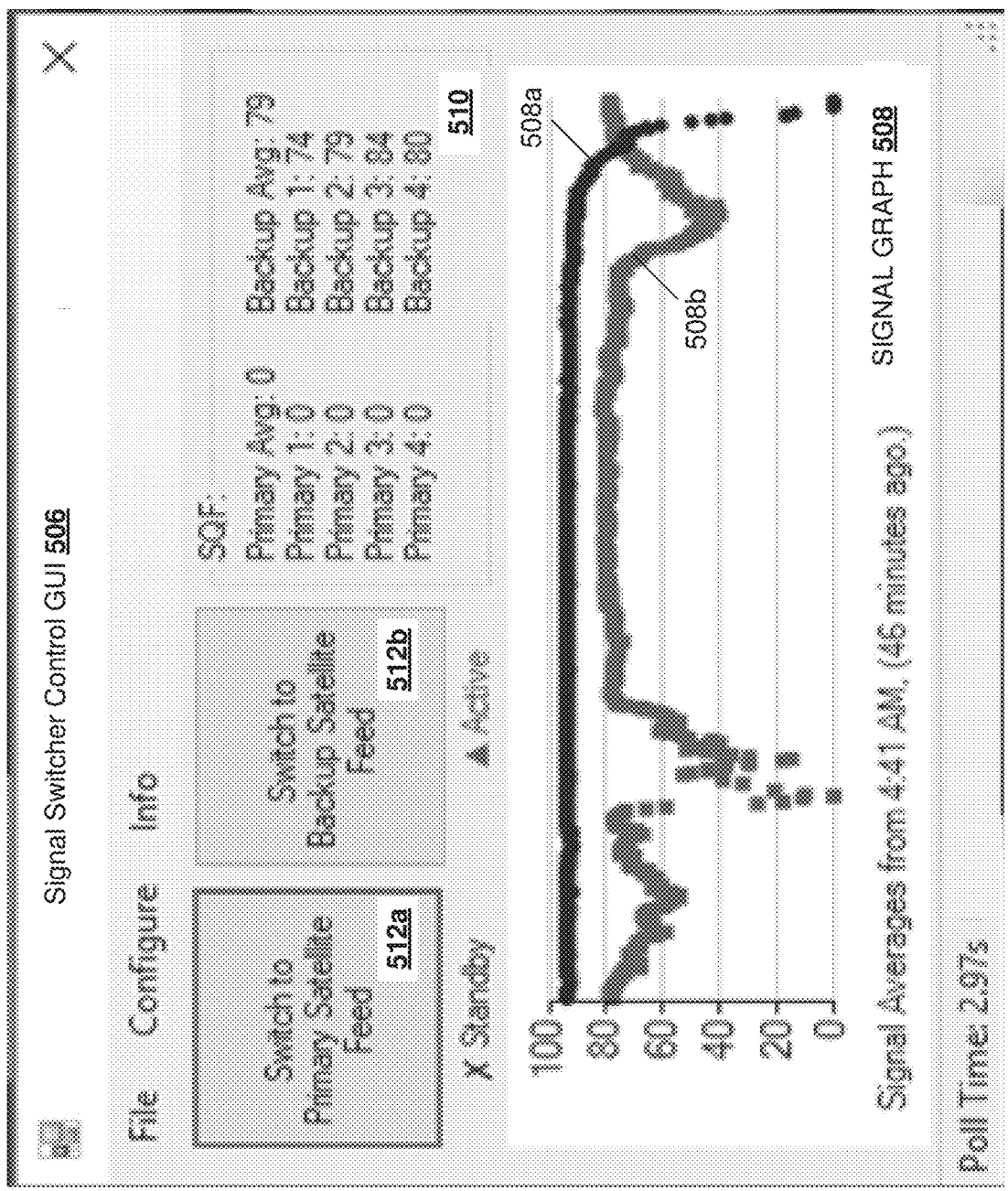
FIG. 5B is a screen shot illustrating an embodiment of a display device in the content distribution system of FIG. 1 displaying a video matrix and a signal switcher controller GUI.

If at decision block 306, the first signal information and the second signal information do not satisfy the signal switching condition, then the method 300 may return to block 302. However, if at decision block 306, the first signal information and the second signal information satisfy the signal switching condition, then the method 300 may proceed to block 308 where a content signal switch instruction is provided to switch the trunk distribution system from being provided the first content signal to being provided the second content signal. In an embodiment of block 308, in response to determining that the signal switching condition is satisfied, the content signal switching module 204 may provide a content signal switch instruction to the switch device 126. As illustrated in FIG. 4A, the content signal switching controller 140 may provide a content signal switch instruction 406 to the switch device 126. The content signal switch instruction 406 may cause switch device 126 to provide the content signal 404 from the backup satellite antenna 114*b* to the trunk distribution system 116 instead of the content signal 402 that originated form the primary satellite antenna 114*a* as illustrated in FIG. 4B. Similarly, if the content signal 404 is being provided to the trunk distribution system 116 such that the backup satellite antenna 114*b* is active and the switch device 126 receives the content signal switch instruction 406, then the content signal switch instruction 406 may cause the switch device 126 to provide the content signal 402 from the primary satellite antenna 114*a* to the trunk distribution system 116 instead of the content signal 404 that originated form the backup satellite antenna 114*b*.

Thus, systems and methods have been described that provided for a content distribution system that includes a satellite signal switching system that includes a backup satellite antenna in addition to a primary satellite antenna that are both coupled to a switch device that is coupled to a trunk distribution system. The switch device may be configured to switch between the content signals provided by the backup satellite antenna and the primary satellite antenna based on content signal switch instruction received by a content signal switching controller. The backup satellite antenna may be located at a different geographical location than the geographical location in which the primary satellite antenna is positioned. As such, the backup satellite antenna may not be experiencing the weather condition or other interfering condition that is near the geographical location of the primary satellite antenna. The content signal switching controller may monitor content signals provided by the primary satellite antenna and provided by the backup satellite antenna that are being received by the switch device. The content signals may be monitored by the content signal switching controller via monitoring set-top box receivers configured to provide the content signal switching controller content signal information of the content signals that are being provided by each monitoring set-top box receiver. The content signal switching controller may determine whether the signal information about the content signals from the primary satellite antenna and the signal information about the content signals form the backup satellite antenna satisfy a content signal switching condition. If the content signal switching condition is satisfied, the content signal switching controller will provide content signal switch instruction to the switch device to provide the content signal from the backup satellite signal to the trunk distribution system instead of the content signal provided by the primary satellite antenna. As such, the systems and methods of the present disclosure improve content distribution systems by making those content distribution systems more reliable by reducing the effects of weather on the content distribution system.

Figure 6:
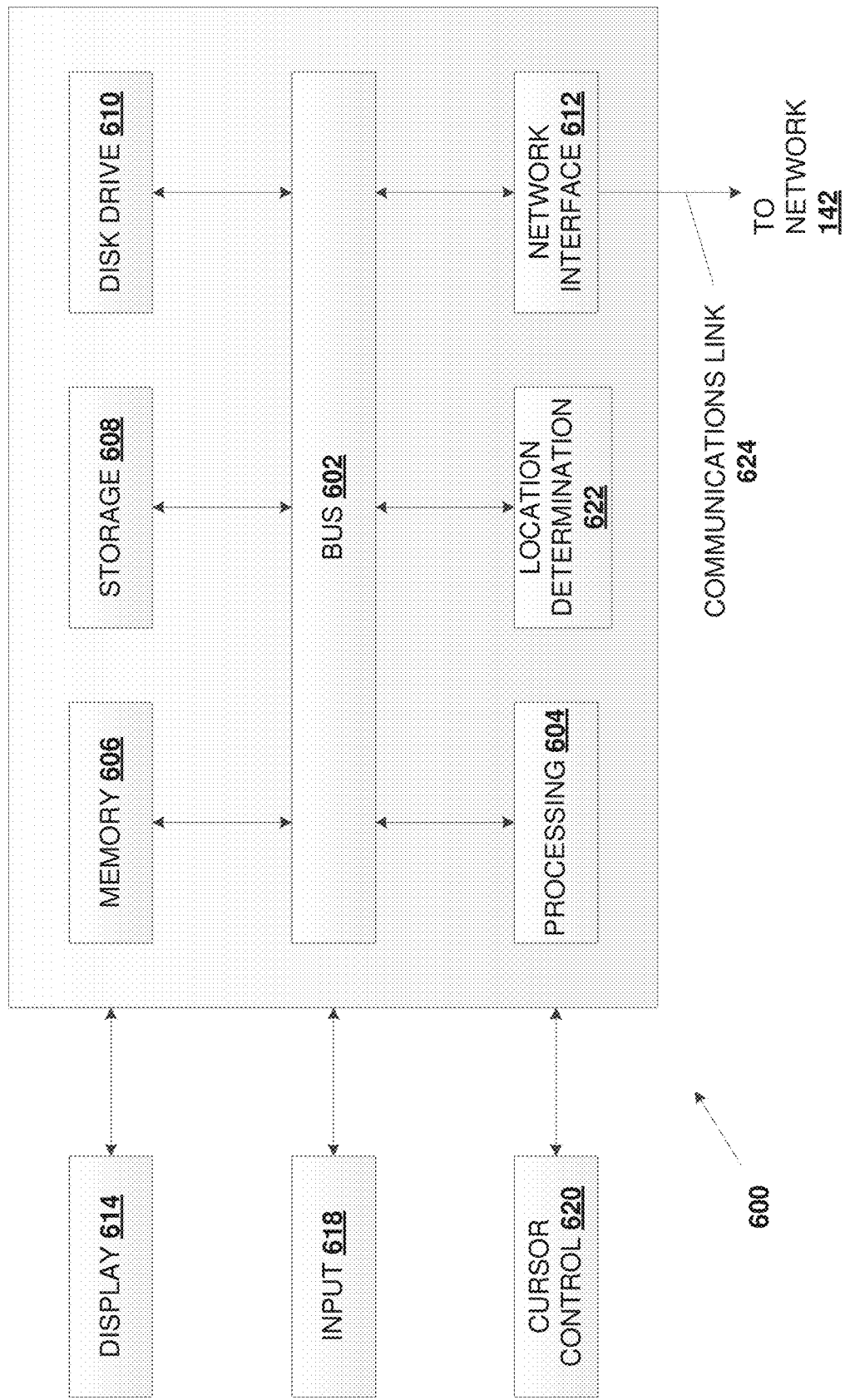
FIG. 6 is a schematic view illustrating an embodiment of a computer system.

Referring now to FIG. 6, an embodiment of a computer system 600 suitable for implementing, for example, the switch device 126, the video matrix switch 134, the content signal switching controller 140 and 200, the remote monitoring device 144, and the monitoring set-top box receivers 128a(1)-128a(4) and 128b(1)-128b(4) 102a, 102b, and 200 is illustrated. It should be appreciated that other devices utilized in the content distribution system 100 discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), and/or a location determination component 622 (e.g., a Global Positioning System (GPS) device as illustrated, a cell tower triangulation device, and/or a variety of other location determination devices.) In one implementation, the disk drive component 610 may comprise a database having one or more disk drive components.

In accordance with embodiments of the present disclosure, the computer system 600 performs specific operations by the processing component 604 executing one or more sequences of instructions contained in the system memory component 606, such as described herein with respect to the switch device(s), the video matrix switch(es), the content signal switching controller(s), the remote monitoring device(s), and the monitoring set-top box receivers. Such instructions may be read into the system memory component 606 from another computer-readable medium, such as the static storage component 608 or the disk drive component 610. In other embodiments, hardwired circuitry may be used in place of or in combination with software instructions to implement the present disclosure.

Logic may be encoded in a computer-readable medium, which may refer to any medium that participates in providing instructions to the processing component 604 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 610, volatile media includes dynamic memory, such as the system memory component 606, and tangible media employed incident to a transmission includes coaxial cables, copper wire, and fiber optics, including wires that comprise the bus 602 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, solid state drive, or any other medium from which a computer is adapted to read. In various embodiments, the computer-readable media are non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 142 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (e.g., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
    receiving, by a content signal switching controller, first signal information about a first content signal provided by a first satellite antenna and received by a trunk distribution system, wherein the first content signal includes a first plurality of programming channel content signals, wherein the first signal information indicates a quality of a satellite signal received by the first satellite antenna and converted to the first content signal, wherein the first signal information further indicates a quality of each programming channel content signal of the first plurality of programming channel content signals;
    receiving, by the content signal switching controller, second signal information about a second content signal provided by a second satellite antenna, wherein the second content signal includes a second plurality of programming channel content signals, wherein the second signal information indicates a quality of the satellite signal received by the second satellite antenna, wherein the second signal information further indicates a quality of each programming channel content signal of the second plurality of programming channel content signals;
    determining, by the content signal switching controller and based on the quality of each programming channel content signal of the first plurality of programming channel content signals and the quality of each programming channel content signal of the second plurality of programming channel content signals, that a first signal switching condition is satisfied; and
    providing, by the content signal switching controller and in response to the determining that the first signal switching condition is satisfied, a first content signal switch instruction to switch the trunk distribution system from being provided the first content signal to being provided the second content signal.

2. The method of claim 1, wherein a portion of the first signal information is received from a first signal sensor that receives the first content signal, and wherein a portion of the second signal information is received from a second signal sensor that receives the second content signal.

3. The method of claim 2, wherein the first signal sensor is included in a first monitoring set-top box receiver and the second signal sensor is included in a second monitoring set-top box receiver.

4. The method of claim 3, wherein the first monitoring set-top box receiver that receives the first content signal is tuned in to a first programming channel known to be provided by the first content signal that is known to be provided on a first trunk cable of a first set of trunk cables that are coupled to the first satellite antenna, and wherein the second monitoring set-top box receiver that receives the second content signal is tuned in to a second programming channel known to be provided by the second content signal that is known to be provided on a first trunk cable of a second set of trunk cables that are coupled to the second satellite antenna.

5. The method of claim 4, wherein the second programming channel is the same programming channel as the first programming channel.

6. The method of claim 4, further comprising:
    setting, by the content signal switching controller, the first monitoring set-top box receiver to the first programming channel.

7. The method of claim 1, wherein the first satellite antenna is positioned at a first geographical location, and wherein the second satellite antenna is positioned at a second geographical location remote from the first geographical location.

8. The method of claim 1, wherein each programming channel content signal of the first plurality of programming channel content signals is provided on a respective trunk cable of a first set of trunk cables that are coupled to the first satellite antenna; and
    wherein each programming channel content signal of the second plurality of programming channel content signals is provided on a respective trunk cable of a second set of trunk cables that are coupled to the second satellite antenna.

9. The method of claim 1, wherein the providing, in response to the determining that the first signal switching condition is satisfied, the first content signal switch instruction to switch the trunk distribution system from being provided the first content signal to being provided the second content signal includes:
    providing the first content signal switch instruction to a switch device that provides the second content signal to the trunk distribution system instead of the first content signal.

10. The method of claim 1, further comprising:
    receiving, subsequent to the providing the first content signal switch instruction, subsequent first signal information and subsequent second signal information;
    determining that the subsequent first signal information and the subsequent second signal information satisfy a second signal switching condition; and
    providing, in response to the determining that the subsequent first signal information and the subsequent second signal information satisfy the second signal switching condition, a second content signal switch instruction to switch the trunk distribution system from being provided the second content signal to being provided the first content signal.

11. The method of claim 1, further comprising:
    determining that a reset condition is satisfied; and
    providing, in response to the determining that the reset condition is satisfied, a second content signal switch instruction to switch the trunk distribution system from being provided the second content signal to being provided the first content signal.

12. The method of claim 1, wherein the first plurality of programming channel content signals includes a first programming channel content signal, a second programming channel content signal, and a third programming channel content signal, wherein the second plurality of programming channel content signals includes a fourth programming channel content signal that corresponds to the first programming channel content signal, a fifth programming channel content signal that corresponds to the second programming channel content signal, and a sixth programming channel content signal that corresponds to the third programming channel content signal, wherein the determining that the first signal switching condition is satisfied is based on the quality of the first programming channel content signal being lower than the quality of the fourth programming channel content signal, the quality of the second programming channel content signal being lower than the quality of the fifth programming channel content signal, and despite the quality of the third programming channel content signal being equal to or higher than the quality of the sixth programming channel content signal.

13. The method of claim 12, wherein the first signal switching condition is not satisfied if the quality of the first programming channel content signal is not lower than the quality of the fourth programming channel content signal and if the quality of the second programming channel content signal is not lower than the quality of the fifth programming channel content signal, despite the quality of the third programming channel content signal being lower than the quality of the sixth programming channel content signal.

14. The method of claim 1, wherein the determining that the first signal switching condition is satisfied is based on an average of the quality of each programming channel content signal of the first plurality of programming channel content signals and an average of the quality of each programming channel content signal of the second plurality of programming channel content signals.

15. A content signal switching controller, comprising:
   a processor; and
   a computer-readable medium storing instructions which, when executed by the processor cause the processor to perform operations comprising:
   receiving first signal information about a first content signal provided by a first satellite antenna and received by a trunk distribution system, wherein the first content signal includes a first plurality of programming channel signals, wherein the first signal information indicates a quality of a satellite signal received by the first satellite antenna and converted to the first content signal, wherein the first signal information further indicates a quality of each programming channel signal of the first plurality of programming channel signals;
   receiving second signal information about a second content signal provided by a second satellite antenna, wherein the second content signal includes a second plurality of programming channel signals, wherein the second signal information indicates a quality of the satellite signal received by the second satellite antenna, wherein the second signal information further indicates a quality of each programming channel signal of the second plurality of programming channel signals;
   determining, based on the quality of each programming channel signal of the first plurality of programming channel signals and the quality of each programming channel signal of the second plurality of programming channel signals, that a first signal switching condition is satisfied; and
   providing, in response to the determining that the first signal switching condition is satisfied, a first content signal switch instruction to switch the trunk distribution system from being provided the first content signal to being provided the second content signal.

16. The content signal switching controller of claim 15, wherein the first satellite antenna is positioned at a first geographical location, and wherein the second satellite antenna is positioned at a second geographical location remote from the first geographical location.

17. The content signal switching controller of claim 15, wherein the operations further comprise:
   receiving, subsequent to the providing the first content signal switch instruction, subsequent first signal information and subsequent second signal information;
   determining that the subsequent first signal information and the subsequent second signal information satisfy a second signal switching condition; and
   providing, in response to the determining that the subsequent first signal information and the subsequent second signal information satisfy the second signal switching condition, a second content signal switch instruction to switch the trunk distribution system from being provided the second content signal to being provided the first content signal.

18. A non-transitory computer-readable storage medium storing instructions which, when executed by a processor, cause the processor to perform operations, the operations comprising:
   receiving first signal information about a first content signal provided by a first satellite antenna and received by a trunk distribution system, wherein the first content signal includes a first plurality of programming channel content signals, wherein the first signal information indicates a quality of a satellite signal received by the first satellite antenna and converted to the first content signal, wherein the first signal information further indicates a quality of each programming channel content signal of the first plurality of programming channel content signals;
   receiving second signal information about a second content signal provided by a second satellite antenna, wherein the second content signal includes a second plurality of programming channel content signals, wherein the second signal information indicates a quality of the satellite signal received by the second satellite antenna, wherein the second signal information further indicates a quality of each programming channel content signal of the second plurality of programming channel content signals;
   determining, based on the quality of each programming channel content signal of the first plurality of programming channel content signals and the quality of each programming channel content signal of the second plurality of programming channel content signals, that a first signal switching condition is satisfied; and
   providing, in response to the determining that the first signal switching condition is satisfied, a first content signal switch instruction to switch the trunk distribution system from being provided the first content signal to being provided the second content signal, wherein the first satellite antenna is positioned at a first geographical location, and wherein the second satellite antenna is positioned at a second geographical location remote from the first geographical location.

19. The non-transitory computer-readable storage medium of claim 18, wherein the determining that the first signal switching condition is satisfied is further based on an average of the quality of each programming channel content signal of the first plurality of programming channel content signals and an average of the quality of each programming channel content signal of the second plurality of programming channel content signals.

20. The non-transitory computer-readable storage medium of claim 18, wherein the operations further comprise:
   receiving, subsequent to the providing the first content signal switch instruction, subsequent first signal information and subsequent second signal information;
   determining that the subsequent first signal information and the subsequent second signal information satisfy a second signal switching condition; and
   providing, in response to the determining that the subsequent first signal information and the subsequent second signal information satisfy the second signal switching condition, a second content signal switch instruction to switch the trunk distribution system from being provided the second content signal to being provided the first content signal.

* * * * *